(12) United States Patent
Kim et al.

(10) Patent No.: US 7,369,932 B2
(45) Date of Patent: May 6, 2008

(54) SYSTEM AND METHOD FOR TURBINE ENGINE FAULT DETECTION USING DISCRETE EVENT SYSTEM MODELING

(75) Inventors: Kyusung Kim, Plymouth, MN (US); Dinkar Mylaraswamy, Fridley, MN (US); Doug Sturm, Show Low, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/418,992

(22) Filed: May 4, 2006

(65) Prior Publication Data
US 2007/0260390 A1    Nov. 8, 2007

(51) Int. Cl.
  *G06F 19/00* (2006.01)
  *G06G 7/70* (2006.01)
(52) U.S. Cl. .......... 701/100; 701/29; 701/34; 700/287; 700/290; 73/116; 73/117.2; 477/30; 477/53
(58) Field of Classification Search ........ 701/100, 701/29, 34, 99; 700/287, 290; 702/FOR. 113, 702/182, 185; 73/116, 117.2; 105/36, 38, 105/61.5; 184/3.11; 415/902, 13; 477/30, 477/53
See application file for complete search history.

(56) References Cited

U.S. PATENT DOCUMENTS

| | | | | |
|---|---|---|---|---|
| 2,971,338 A | * | 2/1961 | Bodemuller | 60/39.281 |
| 3,238,768 A | * | 3/1966 | Richardson | 73/117.3 |
| 3,300,785 A | * | 1/1967 | Richardson et al. | 346/17 |
| 3,310,937 A | * | 3/1967 | Smith | 60/790 |
| RE28,109 E | * | 8/1974 | Provenzano et al. | 701/35 |
| 3,946,364 A | | 3/1976 | Codomo et al. | |
| 4,122,667 A | * | 10/1978 | Hosaka et al. | 60/39.091 |
| 4,135,246 A | * | 1/1979 | McMannis | 701/100 |
| 4,153,023 A | * | 5/1979 | Asano et al. | 123/688 |
| 4,157,124 A | * | 6/1979 | Poore | 180/178 |
| 4,355,358 A | | 10/1982 | Clelford et al. | |

(Continued)

OTHER PUBLICATIONS

Modelling military airborne mission systems for functional analysisKristenssen, L.M.; Billington, J.; Qureshi, Z.H.;Digital Avionics Systems, 2001. DASC. The 20th Conferencevol. 1, Oct. 14-18, 2001 pp. 4A2/1-4A2/12 vol. 1 Digital Object Identifier 10.1109/DASC.2001.963363.*

(Continued)

*Primary Examiner*—Khoi H. Tran
*Assistant Examiner*—Jorge O Peche
(74) *Attorney, Agent, or Firm*—Ingrassia, Fisher & Lorenz, P.C.

(57) ABSTRACT

A system and method is provided for fault detection in a turbine engine. The fault detection system and method uses discrete event system modeling to provide improved fault diagnosis and prognosis. The fault detection system and method receives sensor taken at multiple dynamic events occurring in different time windows. An event determination mechanism evaluates the received sensor data to determine if specified events have occurred. Indications of the occurrence of specified events are then passed to a discrete event system model. The discrete event system model analyzes the timing and sequencing of the event occurrences to determine if a fault has occurred. This method does not require a detailed modeling of the system, and thus can be applied to complex systems such as turbine engines.

15 Claims, 5 Drawing Sheets

U.S. PATENT DOCUMENTS

| | | | |
|---|---|---|---|
| 4,378,673 A * | 4/1983 | Abo et al. .................... 60/790 |
| 4,428,467 A * | 1/1984 | Hiramatsu ................. 192/3.31 |
| 4,594,668 A * | 6/1986 | Fujawa et al. ............. 701/100 |
| 4,604,701 A * | 8/1986 | Fujawa et al. ................ 701/99 |
| 5,243,949 A * | 9/1993 | Osawa ....................... 123/676 |
| 5,408,412 A | 4/1995 | Hogg et al. |
| 5,463,567 A | 10/1995 | Boen et al. |
| 5,479,350 A | 12/1995 | Barakchi et al. |
| 5,528,516 A | 6/1996 | Yemini et al. |
| 5,748,500 A | 5/1998 | Quentin et al. |
| 5,778,856 A * | 7/1998 | Okada et al. .......... 123/406.47 |
| 5,813,386 A * | 9/1998 | Okada et al. .......... 123/339.14 |
| 6,276,128 B1 * | 8/2001 | Kammann et al. ............. 60/274 |
| 6,301,531 B1 | 10/2001 | Pierro et al. |
| 6,336,065 B1 | 1/2002 | Gibson et al. |
| 6,415,395 B1 | 7/2002 | Varma et al. |
| 6,442,511 B1 | 8/2002 | Sarangapani et al. |
| 6,470,258 B1 * | 10/2002 | Leamy et al. ............... 701/100 |
| 6,574,537 B2 | 6/2003 | Kipersztok et al. |
| 6,651,422 B1 * | 11/2003 | LeGare ........................ 60/277 |
| 6,725,137 B2 | 4/2004 | Eagleton et al. |
| 6,732,063 B2 | 5/2004 | Famili et al. |
| 6,741,919 B1 | 5/2004 | Schuster et al. |
| 6,748,304 B2 | 6/2004 | Felke et al. |
| 6,760,639 B2 | 7/2004 | Kallela et al. |
| 6,766,230 B1 | 7/2004 | Rizzoni et al. |
| 6,813,549 B2 | 11/2004 | Good |
| 6,868,325 B2 * | 3/2005 | Menon et al. .............. 701/100 |
| 6,901,318 B1 | 5/2005 | Morronigiello et al. |
| 6,909,960 B2 | 6/2005 | Volponi et al. |
| 6,945,030 B2 * | 9/2005 | Hirayama et al. ......... 60/39.27 |
| 6,947,797 B2 | 9/2005 | Dean et al. |
| 6,957,202 B2 | 10/2005 | Skaanning et al. |
| 6,959,236 B2 | 10/2005 | Betters et al. |
| 7,076,940 B2 * | 7/2006 | Hirayama et al. ......... 60/39.27 |
| 7,117,662 B2 * | 10/2006 | Hirayama et al. ......... 60/39.27 |
| 7,296,550 B2 * | 11/2007 | Trask et al. ............ 123/179.18 |
| 7,302,337 B2 * | 11/2007 | Jargenstedt ................. 701/114 |
| 2003/0010317 A1 * | 1/2003 | Iida et al. .............. 123/406.47 |
| 2004/0055273 A1 * | 3/2004 | Hirayama et al. ....... 60/39.281 |
| 2004/0176901 A1 * | 9/2004 | Uluyol et al. ............... 701/100 |
| 2005/0119818 A1 * | 6/2005 | Jargenstedt ................. 701/100 |
| 2005/0204745 A1 * | 9/2005 | Hirayama et al. ............ 60/773 |
| 2005/0209767 A1 * | 9/2005 | Kim et al. .................. 701/100 |
| 2005/0211222 A1 * | 9/2005 | Demura et al. ......... 123/339.11 |
| 2006/0117737 A1 * | 6/2006 | Ohsaki ........................ 60/276 |
| 2006/0201132 A1 * | 9/2006 | Hirayama et al. ......... 60/39.27 |
| 2007/0051111 A1 * | 3/2007 | Uluyol et al. ................. 60/778 |
| 2007/0062179 A1 * | 3/2007 | Leone ......................... 60/285 |
| 2007/0161457 A1 * | 7/2007 | Geywitz et al. ............ 477/107 |
| 2007/0260390 A1 * | 11/2007 | Kim et al. .................. 701/100 |

OTHER PUBLICATIONS

Tadao Murata, Petri Nets: Properties, Analysis and Applications, Proceedings of the IEEE, Apr. 1989, pp. 541-580, vol. 77, No. 4, Chicago, Il.

Alessandra Fanni, and Alessandro Giua, Discrete Event Representation of Qualitative Models Using Petri Nets, IEEE Tansactions on Systems, Man, and Cybernetics, Dec. 1998.

* cited by examiner

SYSTEM AND METHOD FOR TURBINE ENGINE FAULT DETECTION USING DISCRETE EVENT SYSTEM MODELING

FIELD OF THE INVENTION

This invention generally relates to diagnostic systems, and more specifically relates to prognosis systems for mechanical systems.

BACKGROUND OF THE INVENTION

Modern mechanical systems can be exceedingly complex. The complexities of modern mechanical systems have led to increasing needs for automated prognosis and fault detection systems. These prognosis and fault detection systems are designed to monitor the mechanical system in an effort to predict the future performance of the system and detect potential faults. These systems are designed to detect these potential faults such that the potential faults can be addressed before the potential faults lead to failure in the mechanical system.

One type of mechanical system where prognosis and fault detection is of particular importance is aircraft systems. In aircraft systems, prognosis and fault detection can detect potential faults such that they can be addressed before they result in serious system failure and possible in-flight shutdowns, take-off aborts, delays or cancellations.

Turbine engines are a particularly critical part of many aircraft. Turbine engines are commonly used for main propulsion aircraft. Furthermore, turbine engines are commonly used in auxiliary power units (APUs) that are used to generate auxiliary power and compressed air for use in the aircraft. Given the critical nature of turbine engines in aircraft, the need for fault detection in turbine engines is of extreme importance.

Some previous fault detection systems for turbine engines have relied upon feature extraction to examine sensor data for evidence of failure and explicit knowledge such as heuristics to the evidence of failure. However, this type of approach will suffer in applications where explicit knowledge cannot be easily applied to extracted features. For example, where different types of failures are expressed in evidences spread over different durations of times. In these cases the disparity in space and time can interfere with the ability of interpret the sensor data and limit the effectiveness of the fault detection.

Thus, what is needed is an improved system and method for fault detection in mechanical systems such as turbine engines.

BRIEF SUMMARY OF THE INVENTION

The present invention provides a system and method for fault detection in a turbine engine. The fault detection system and method uses discrete event system modeling to provide improved fault diagnosis and prognosis. The fault detection system and method receives sensor taken at multiple dynamic events occurring in different time windows. An event determination mechanism evaluates the received sensor data to determine if specified events have occurred. Indications of the occurrence of specified events are then passed to a discrete event system model. The discrete event system model analyzes the timing and sequencing of the event occurrences to determine if a fault has occurred. This method does not require a detailed modeling of the system, and thus can be applied to complex systems such as turbine engines.

In one embodiment, the discrete event system model is implemented with a Petri net. In this embodiment, the Petri net includes a plurality of place nodes, transitions and tokens. In this case, when an event occurrence is detected, then one or more tokens are added to the place nodes of the Petri net associated with the detected event occurrences. If the event occurrence is not detected, then no tokens are introduced into the Petri net. The combined quantity of the tokens from the detected event occurrence and the previously existed tokens make up the current indicator of the Petri net. The qualitative representation of the discrete event system is determined by the effects of the new tokens propagating down the Petri net. The propagation down the Petri net moves one or more tokens from places to places by firing any enabled transitions, resulting in new indicators. Thus, the indicator in the Petri net represents the states of the system based on the sensor readings. For fault detection, the Petri net new event indicator are inputted into the net, causing the Petri net generate the updated tokens, which can then be analyzed used to detect unsynchronized occurrences of events.

In one specific example, the Petri net is implemented to detect faults that occur during engine startup. In this embodiment, the event determination mechanism is implemented to receive sensor data corresponding to engine temperature, engine speed and engine start time. The event determination mechanism compares the sensor data to threshold values, and generates event indicators responsive to events where the sensor data deviated from the threshold values. Those event indicators are then passed to the Petri net. The Petri net is designed to determine if an engine speed event is followed by an engine temperature event with a first specified time period, and if an engine start time event occurred within a second specified time period of the engine temperature event. If such a pattern of events occurs, an alarm is issued indicating a likelihood of fault occurring during turbine engine startup.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a system and method for fault detection in a turbine engine. The fault detection system and method uses discrete event system modeling to provide improved fault diagnosis and prognosis. This method does not require a detailed modeling of the system, and thus can be applied to complex systems such as turbine engines. The fault detection system and method can implemented to detect a wide range of faults on a variety of turbine engines. For example, the system and method can be implemented to detect faults on turbine engines used for vehicle propulsion (e.g., aircraft) and for power generation (e.g., aircraft auxiliary power units, electricity generation).

Figure 1:
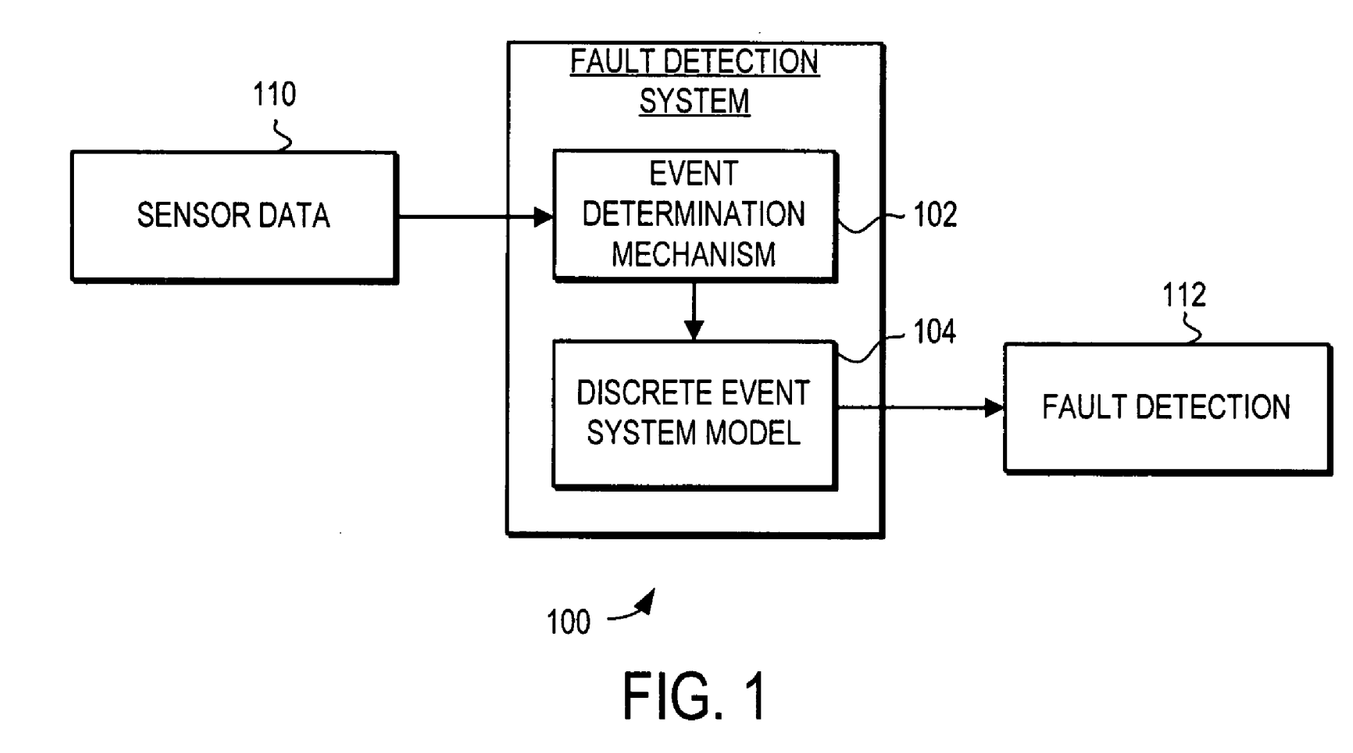
FIG. 1 is a schematic view of a fault detection system.

Turning now to FIG. 1, a schematic view of a fault detection system 100 is illustrated. The fault detection system 100 includes an event determination mechanism 102 and a discrete event system model 104. The fault detection system 100 receives sensor data 110 taken at multiple dynamic events occurring in different time windows. The event determination mechanism 102 evaluates the received sensor data to determine if specified events have occurred. Indications of the occurrence of specified events are then passed to the discrete event system model 104 in the form of "event indicators", which are an indication of the time and occurrence of a specified event. The discrete event system model 104 analyzes the timing and sequencing of the event occurrences to determine if a fault has occurred, and an indication of fault detection 112 is generated.

In general, a discrete event system is a dynamic system whose behavior is governed by the occurrence of physical events that cause changes to the state of the system. These systems are typically characterized by a discrete state space of logical values and event driven dynamics. A turbine engine is an example of the type of complex system that can be described as a discrete event system. In this case, a model is used to describe the timing and sequencing relationship of events in the turbine engine. The discrete event system model can describe the qualitative behavior of the turbine engines, including both normal and an abnormal behavior. In this application a discrete event system model is thus defined as a model that can simulate the state of turbine engine to generate the health conditions by analyzing several sequences of events occurring at different time frames. This type of model can detect a fault of which symptoms are indicated by subsequent asynchronous events.

In one embodiment, the discrete event system model of the turbine engine is implemented using a Petri net. In general, a Petri net, sometimes referred to as a Place/Transition net, is one type of mathematical representation of discrete event systems. A Petri net typically includes a plurality of places, transitions and directed arcs. These features allow the Petri net to depict the structure of a discrete event system.

In a Petri net, arcs run between places and transitions. Places may contain any number of tokens, and a distribution of tokens over places of the net is generally referred to as a marking. Transitions act on input tokens by a process known as firing. A transition is enabled if it can fire, and this occurs when there are sufficient tokens in every input place. When a transition fires, it consumes the tokens from the input places and performs some processing, and it places a specified number of tokens into each of its output places. Petri nets are non deterministic, such that multiple transitions can be enabled at the same time and any one of which can fire. Furthermore, because transitions are not required to fire, such firing is non-deterministic. Because of this, Petri nets are well suited for modeling concurrent behavior of discrete event systems.

In the embodiments of the present invention, a Petri net is used to model the behavior of a turbine engine. In this embodiment, the Petri net place nodes, transitions and arcs are implemented to model the desired behavior of the turbine engine. When an event occurrence is detected on the turbine engine, then one or more tokens are added to the place nodes of the Petri net associated with the detected event occurrences. If the event occurrence is not detected, then no tokens are introduced into the Petri net. The combined quantity of the tokens from the detected event occurrence and the previously existing tokens make up the current event indicators of the Petri net. The qualitative representation of the discrete event system is determined by the effects of the new tokens propagating down the Petri net. The propagation down the Petri net moves one or more tokens from place to place by firing any enabled transitions, resulting in new markings. The resulting markings thus represent the states of the turbine engine based on the new sensor readings and the previous states. For fault detection, the Petri net new event indicators are inputted into the net, causing the Petri net generate the updated tokens, which can then be analyzed used to detect unsynchronized occurrences of events in the turbine engine.

In one specific example, event determination mechanism 102 and discrete event system model 104 are implemented to detect faults that occur during engine startup of a turbine engine. In this embodiment, the event determination mechanism 102 is implemented to receive sensor data 110 corresponding to engine temperature, engine speed and engine start time. The event determination mechanism compares the sensor data 110 to threshold values, and generates event indicators responsive to events where the sensor data deviated from the threshold values. Those event indicators are then passed to the discrete event system model 104. In this embodiment, the discrete event system model 104 is implemented with a Petri net that is designed to determine if an engine speed event is followed by an engine temperature event with a first specified time period (e.g., within a specified number of engine startups), and if an engine start time event occurred within a second specified time period (e.g., within a specified number of engine startups) of the engine temperature event. If such a pattern of events occurs, an alarm is issued indicating a likelihood of fault occurring during turbine engine startup.

Figure 2:
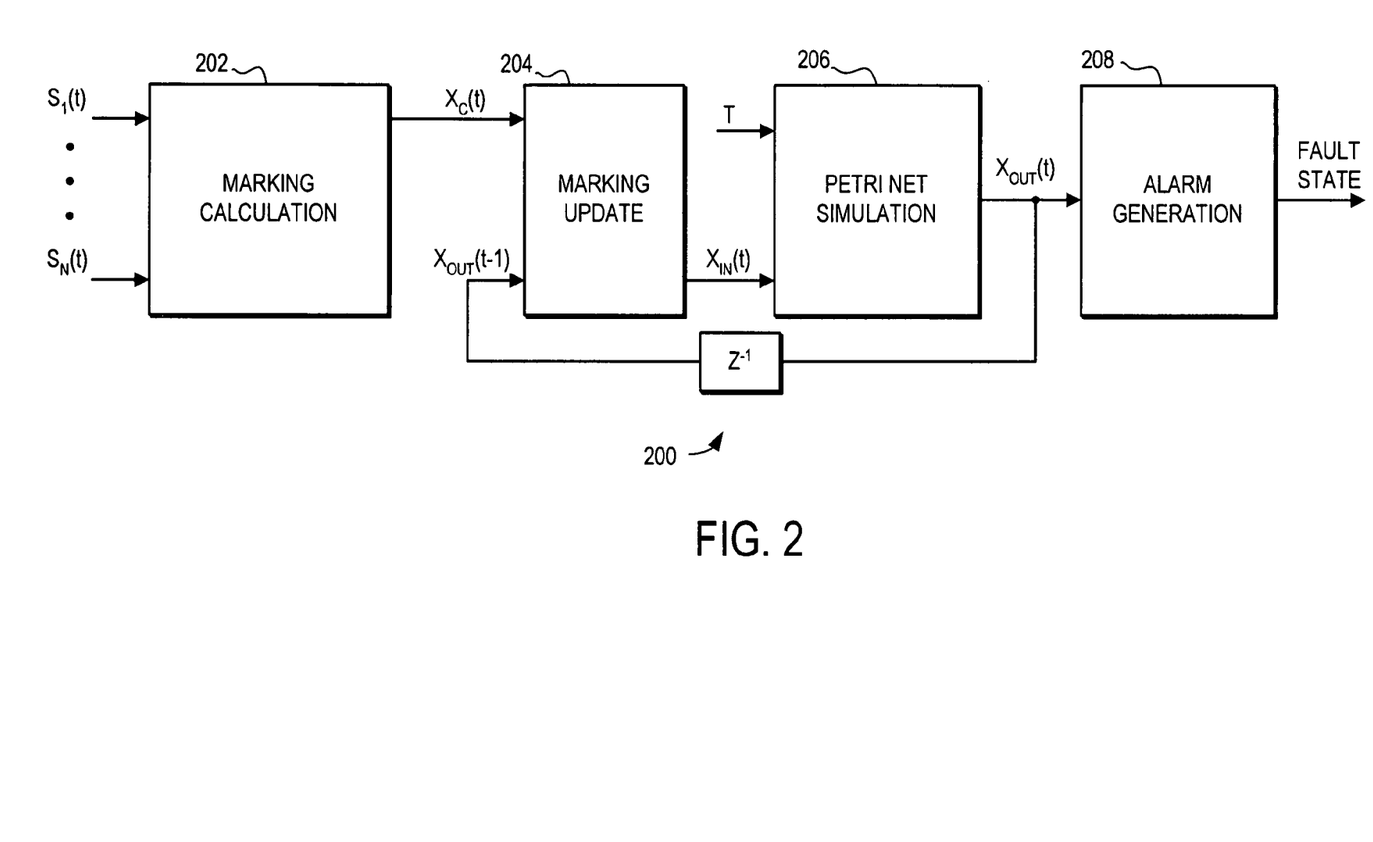
FIG. 2 is a schematic view of fault detection method in accordance with an embodiment of the invention.

Turning now to FIG. 2, a schematic view of a fault detection method 200 in accordance with an embodiment of the invention is illustrated. The method 200 provides for fault detection in a turbine engine using discrete event system modeling. The first step 202 receives sensor data $S_1(t)$ to $S_N(t)$ from the turbine engine and performs a indicator calculation on the sensor data. The marking calculation step 202 evaluates the received sensor data to determine if specified events have occurred, and generates current event indicators (e.g., markings) responsive to the occurrence of specified events. The current event indicators $X_C(t)$, are a snapshot of the marking at the current time as determined by the current sensor readings $S_1(t)$ to $S_N(t)$. The current event indicators $X_C(t)$ are then passed to the marking update step 204.

A variety of different types of sensor data can be used in method 200. For example, turbine engine speed data (e.g., main shaft speed N1, secondary shaft speed N2), engine temperature data (e.g., exhaust gas temperature (EGT)), engine pressure data (e.g., combustor pressure P2) and engine time data can all be used. Additionally, the sensor data can be processed before used in method 200. For example, the sensor data can be filtered, normalized, or averaged with previous values to reduce the effects of noise on the sensor data. Additionally, different combinations of sensor data taken from each event can be used. Additionally, the sensor data can comprise specific indications of events such as faults in specific components or systems. Such an indication can be the results of a built-in-test (BIT) of a particular component. In one specific embodiment to be discussed below, the sensor data comprises three corrected variables that are normalized to the standard conditions: speed at peak EGT, peak EGT and start time.

The sensor data can be received at a variety of different rates depending on the needs of the application. As one specific, sensor data can be received and the current event indicators can be updated for each startup cycle of the turbine engine. When sensor data is received over multiple startup cycles, the fault detection system is able analyze sensor data taken at multiple different events occurring in multiple different time windows.

Thus, it should be noted that a variety of different measures of time t can be used. In one example, real time measurements can be used. As another example, the method 200 can be implemented to receive a set of sensor, and perform steps 202-208 during specifically defined event cycles. For example, each time t can correspond to a turbine engine startup. In this embodiment, the sensor data $S_1(t)$ to $S_N(t)$ corresponds to sensor data received during one startup, although in some cases the sensor data $S_1(t)$ to $S_N(t)$ can be moving averages that include previous sensor data, as well as the new sensor data from the current startup.

The marking calculation step 202 receives sensor data $S_1(t)$ to $S_N(t)$ and determines if specified events have occurred. A variety of different techniques can be used to determine the occurrence of events. For examples, the occurrence of events can be identified by checking moving averaged values of sensor data and comparing them to thresholds. When a specified event has occurred, the place corresponding to that specified event gets a new token. This is done with the current event indicators $X_C(t)$ that are passed to the marking update step 204.

The marking update step 204 generates initial updated indicators $X_{IN}(t)$. The initial updated indicators $X_{IN}(t)$ are generated from the current event indicators $X_C(t)$ and the fed back output indicators from the previous time $X_{OUT}(t-1)$. The current event indicator obtained at the earlier step, $X_C(t)$ represents only the-current indicator resulted from the present snapshot of sensor readings and it does not include any states of the system resulting from the events that occurred in the past. Thus, to obtain the initial updated indicators, the previous time output indicators $X_{OUT}(t-1)$ are fed back and inputted to the indicator update step 204. These two indicators are combined to generate the initial updated indicators $X_{IN}(t)$. The two indicators can be combined by adding elements that correspond to each other. It should be noted that the dimension of $X_C(t)$ and $X_{OUT}(t-1)$ will usually be different, as the size of $X_C(t)$ equals the number of input nodes the Petri net, whereas the size of the $X_{OUT}(t-1)$, equals the number of total nodes of Petri net. Thus, $X_C(t)$ will typically be added to the portion of input nodes of $X_{OUT}(t-1)$.

The next step 206 is to perform a Petri net simulation on the initial updated indicators $X_{IN}(t)$. In general, the Petri net simulation is used to analyze the occurrences of events and generate output indicators for the current time $X_{OUT}(t)$. The Petri net does this by analyzing timing and sequencing of the unsynchronized initial updated indicators $X_{IN}(t)$, which includes the current event indicators and the previous time output indicators.

As one example, given the initial updated indicators $X_{IN}(t)$, the final state of the indicator for the current time will be decided by simulating the Petri net. The Petri net is simulated by firing any enabled transitions using firing information T, which assigns new tokens to places in the Petri net as events are detected. The firing information T has the same number of elements as the number of transitions, and each element represents the firing time assigned to it. The exceedance conditions become and remain true for the durations defined by the firing times. The results of the simulation depend upon the indicators and the logic employed in the Petri net. One specific detailed example of a Petri net modeling logic will be discussed below with reference to FIG. 3.

The simulation of the Petri net results in new indicators for the current time $X_{OUT}(t)$. The new indicators for the current time are passed to the alarm generation step 208. The alarm generation step 208 transforms the final state of the indicators into diagnostic results, namely, deciding if there is a fault or not. As one example, a place in the Petri net can correspond to a certain type of fault (e.g., starter fault). If that place gets a token, then an alarm will be triggered. Additionally, the new indicators for the current time $X_{OUT}(t)$ are fed back to the indicator update, where they will be used in the next cycle as the previous time output indicators $X_{OUT}(t-1)$.

In one embodiment, the fault detection system is implemented with a Petri net to analyze event indicators detect potential faults the startup of turbine engines. In this embodiment, the event determination mechanism is adapted to compare the engine speed at a specified time (e.g., at the time of peak EGT in the engine startup) to a first value to determine engine speed deviation from the first value, and generate an engine speed event indicator responsive to the engine speed deviation exceeding a first threshold. The event determination mechanism is further adapted to compare the EGT at a specified time (e.g., at the time of peak EGT during startup) to a second value to determine engine temperature deviation from the second value, and generate an engine temperature event indicator responsive to the engine temperature deviation exceeding a second threshold. Finally, the event determination mechanism is adapted to compare the time to engine start (e.g., the time to when the starter motor is turned of) to a third value to determine engine start time deviation from the third value and generating a start time event indicator responsive to the engine start time deviation exceeding a third threshold. Based on these comparisons, the event determination mechanism generates current even indicators that are passed to the Petri net, where the timing and sequencing of the current event indicator are analyzed along with past event indicators, and new event indicators are generated that are indicative of fault in the startup of turbine engines.

Figure 3:
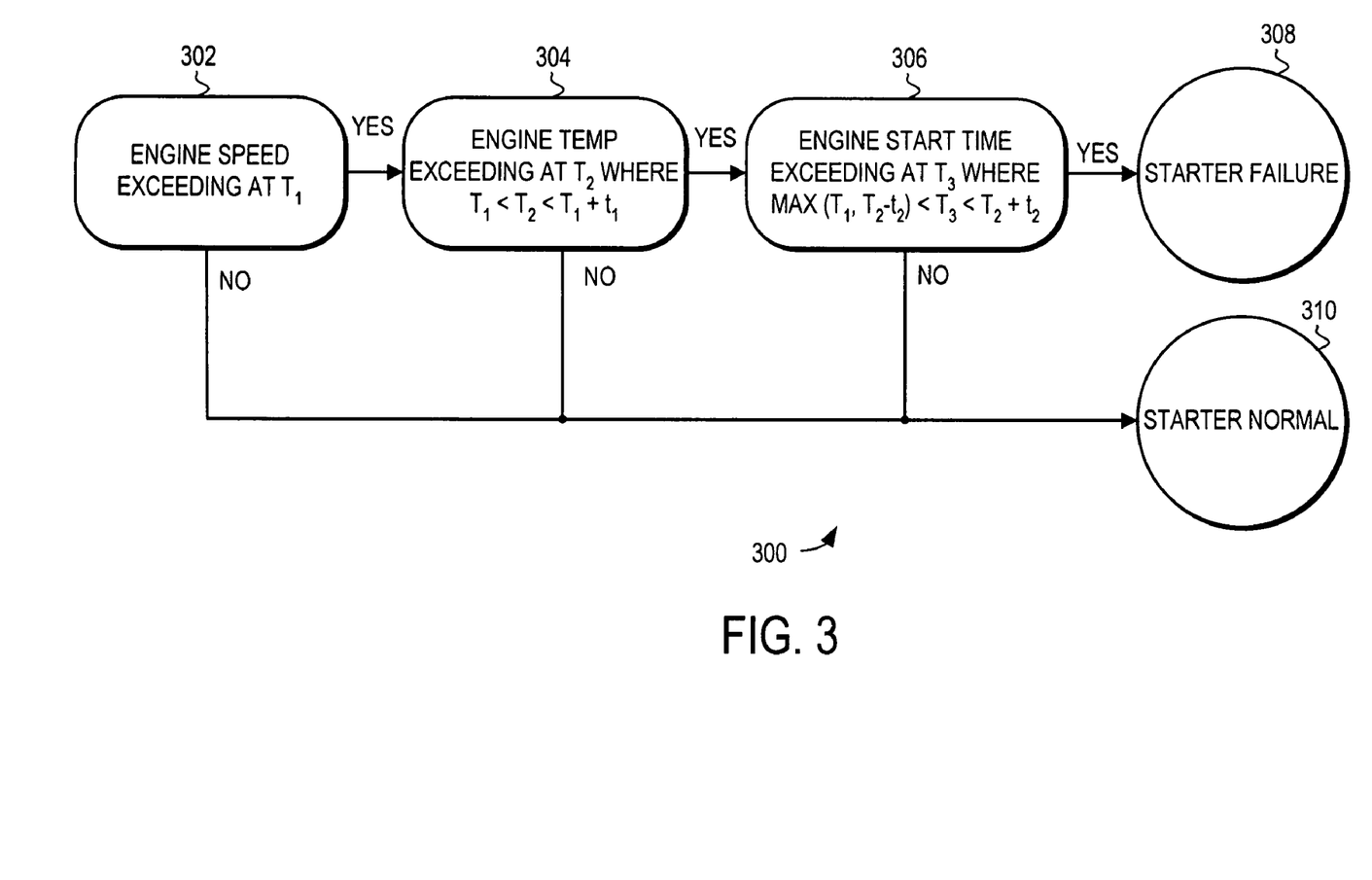
FIG. 3 is a schematic view of a Petri net model logic in accordance with an embodiment of the invention.

Turning now to FIG. 3, an exemplary Petri net model logic 300 is illustrated schematically. The Petri net model logic 300 is exemplary of the type of logic that can be implemented in a Petri net for fault detection in a turbine engine. In this illustrated embodiment, the Petri net model logic 300 is implemented to analyze the timing and sequencing of event indicators to detect potential faults to a starter in a turbine engine using indicators generated from three specific types of sensor data: engine speed at peak EGT, peak EGT and start time.

At step 302, the Petri net model logic 300 analyzes event indicators to determine if the normalized engine speed at peak EGT exceeds a threshold during startup event $T_1$. If the normalized engine speed does not exceed a threshold at this time, then the logic proceeds to step 310, and the starter is normal. If however, the normalized engine speed exceeds the threshold, then the logic proceeds to step 304.

At step 304, the Petri net model logic 300 analyzes event indicators to determine if the normalized peak EGT exceeds a temperature threshold at startup event $T_2$, where $T_2$ is within a set number of startup events $\tau_1$ of event $T_1$. For example, if it is within four startup events. If the normalized peak EGT does not exceed a threshold within this specified period, then the logic proceeds to step 310, and the starter is normal. If however, the normalized peak EGT exceeds the threshold within the period $\tau_1$, then the logic proceeds to step 306.

At step 304, the Petri net model logic 300 analyzes event indicators to determine if the normalized start time exceeds a time threshold at a startup event $T_3$, where $T_3$ is within a set number of startup events $\tau 2$ of time $T_2$, and where the time $T_3$ is smaller than $T_2+\tau_2$ and larger than $T_2-\tau_2$ if $T_1$ occurs earlier than $T_2-\tau_2$, or the time $T_3$ is smaller than $T_2+\tau_2$ and larger than $T_1$ if $T_1$ occurs later than $T_2-\tau_2$. In one example, the set number of startup events $\tau_2$ comprises five events. If the normalized start time does not exceed a threshold within this period, then the logic proceeds to step 310, and the starter is normal. If however, the normalized start time exceeds the threshold within the time period then a starter failure is indicated in step 308.

Thus, the Petri net model logic 300 is designed to determine if an engine speed event is followed by an engine temperature event with a first specified time period (i.e., a specified number of engine starts), and if an engine start time event occurred within a second specified time period of the engine temperature event. If such a pattern of events occurs, an alarm is issued indicating a likelihood of fault occurring in the engine starter.

Of course, this is just one example of how a Petri net can be implemented, and other implementations are possible depending upon application. Furthermore, a starter failure is only one example of the type of turbine engine that the Petri net can be implemented to detect.

As stated above, the Petri net implements a discrete event system model that analyzes the timing and sequencing of the event occurrences to determine if a fault has occurred. In implementing a fault detection system with such a Petri net, one key design parameter that effects performance of the model are the thresholds used by the event determination mechanism to detect when sensor values are exceeded. Another key design parameter is the sequence and time periods between events used by the Petri net. Typically, these values will be decided empirically based on samples obtained from faulty and normal operations.

For example, these parameters can be obtained by deciding upon a search range for the optimal value for each parameter and performing a design-of-experiment simulation that is repeated to find the values that produce the best results in terms of false alarm rate, missed detection rate, and fault prediction horizon.

Figure 4:
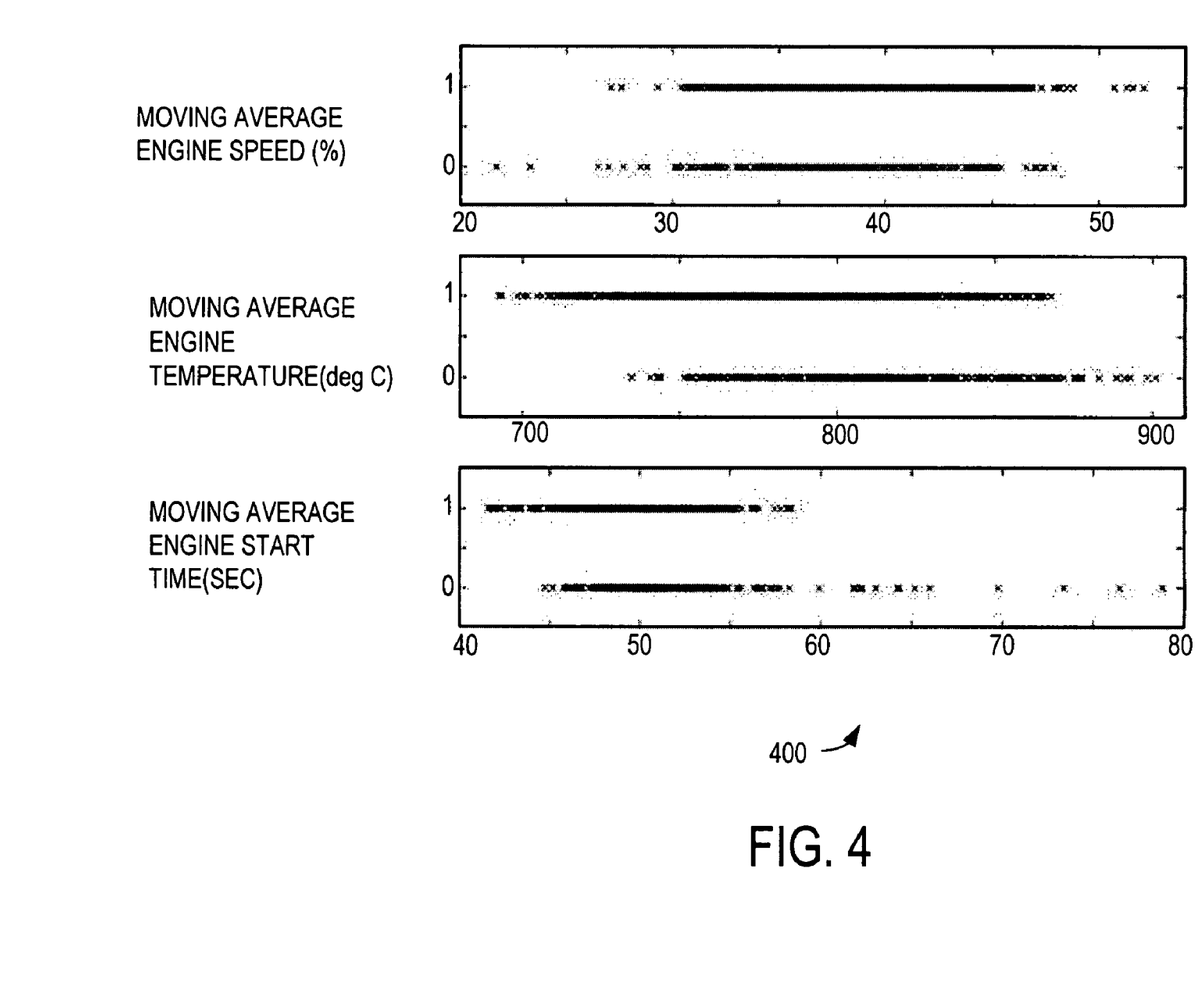
FIG. 4 are graphical representations of observed sensor data.

Proper threshold values can be obtained by analyzing the differences among distributions under normal and faulty conditions. Turning now to FIG. 4, FIG. 4 illustrates three graphs that show moving averages for engine speed, engine temperature and engine start time for an exemplary turbine engine. The averages are assigned a label 1 or 0 depending upon whether the sample was taken before (0) or after (1) a starter fault incident. FIG. 4 shows that in general lower values for engine speed and higher values for engine temperature and start time before the starter incident. These samples represent the operation of the turbine engine with a faulty starter, and thus the threshold dividing the normal and faulty conditions could be obtained by setting the values around these lower or higher ends. However, the samples at the lower or higher ends do not occur simultaneously. In other words the engine speed can have a value at the lower end (e.g., 24%), while at the same time the engine temperature has a value around 800. This would seem to indicate normal operation. Thus, to determine optimal threshold searching should occur over a wide range of variations.

One method to determine the optimal value of time periods between the events and the sequence of the occurrences of the events is to select a range of the timings and the possible sequences of the event occurrences. The Petri net is then simulated with training data sets using various combinations of the different timings and sequences within the range to determine which show the best performance. The performance metrics of the Petri net are false alarm rates, missed detection rates, and prediction time horizon. The selected timings and sequences can then be tested with a test data set to determine if performance is satisfactory. If not, then the range of the timings are changed and the simulation performed again with the different combinations of timings and sequences to determine the optimal values of timings and sequences, i.e., those values that show the best performance on the training data set as well as the test data set. As more data becomes available the timing may be further adjusted.

Figure 5:
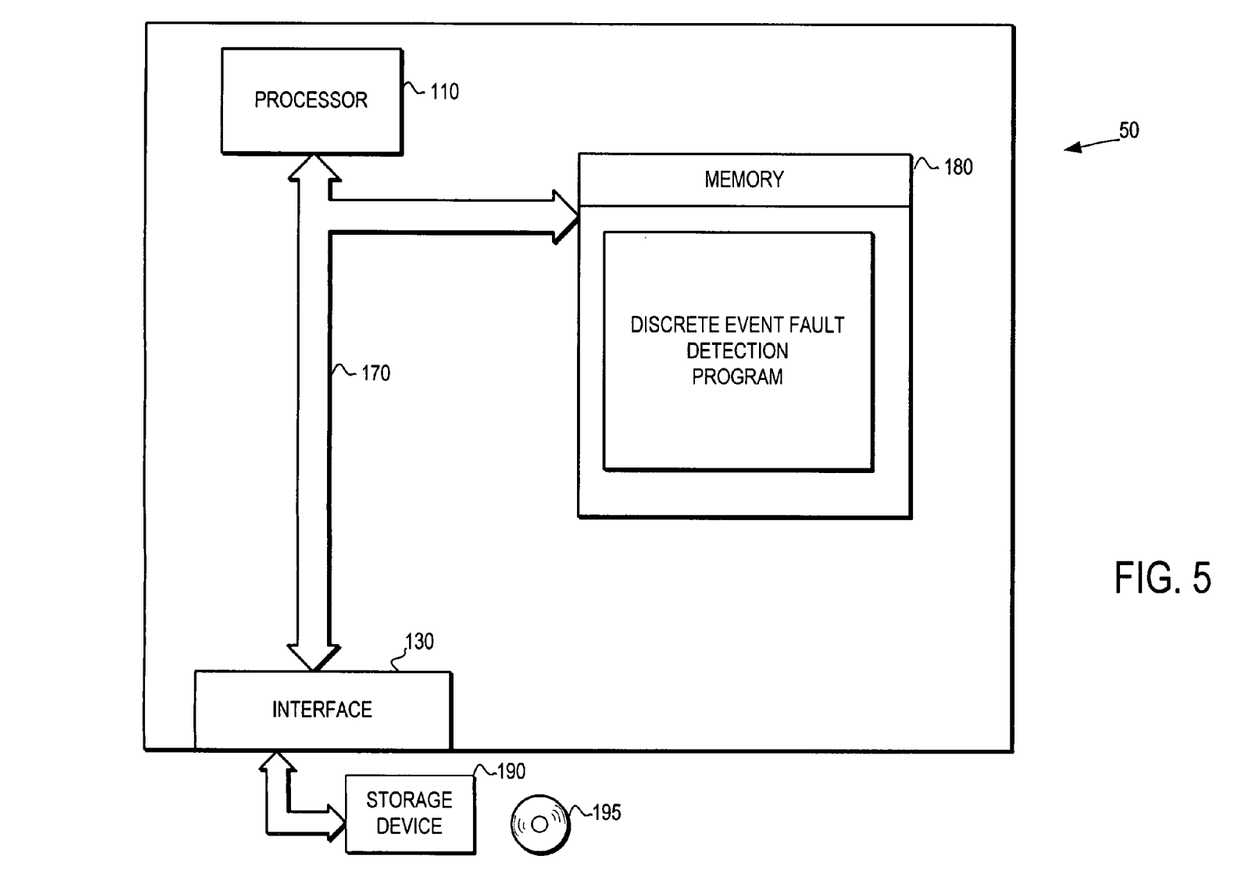
FIG. 5 is schematic view of an exemplary computer system implementing a fault detection system in accordance with an embodiment of the invention.

The fault detection program system and method can be implemented in wide variety of platforms. Turning now to FIG. 6, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft to provide onboard diagnostics, or on the ground to provide remote diagnostics. The exemplary computer system 50 includes a processor 110, an interface 130, a storage device 190, a bus 170 and a memory 180. In accordance with the preferred embodiments of the invention, the memory system 50 includes a discrete event system fault detection program.

The processor 110 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows-communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 6, storage device 190 can comprise a disc drive device that uses discs 195 to store data.

In accordance with the preferred embodiments of the invention, the computer system 50 includes a discrete event fault detection program. Specifically during operation, the discrete event fault detection program is stored in memory 180 and executed by processor 110. When being executed by the processor 110, discrete event fault detection program receives sensor data from the device being monitored and generates a determination of likelihood of fault from that data.

As one example implementation, the deterioration prediction system can operate on data that is acquired from the mechanical system (e.g., aircraft) and periodically uploaded to an internet website. The fault detection analysis is performed by the web site and the results are returned back to the technician or other user. Thus, the system can be implemented as part of a web-based diagnostic and prognostic system.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 195), and transmission media such as digital and analog communication links.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A fault detection system for detecting faults in a turbine engine, the fault detection system comprising:
   an event determination mechanism, the event determination mechanism adapted to:
   (i) receive sensor data from the turbine engine, wherein the sensor data comprises engine speed at peak exhaust gas temperature, exhaust gas temperature at peak exhaust gas temperature, and time to engine start;
   (ii) analyze the sensor data to determine if specified events have occurred by comparing the engine speed at peak exhaust gas temperature to a first value to determine engine speed deviation from the first value, comparing the exhaust gas temperature at peak exhaust gas temperature to a second value to determine engine temperature deviation from the second value, and comparing the time to engine start to a third value to determine engine start time deviation from the third value; and
   (iii) generate current event indicators responsive to the occurrence of the specified events by generating an engine speed event indicator responsive to the engine speed deviation exceeding a first threshold, generating an engine temperature event indicator responsive to the engine temperature deviation exceeding a second threshold, and generating a start time event indicator responsive to the engine start time deviation exceeding a third threshold; and
   a discrete event system model, the discrete event system model adapted to (i) receive the current event indicators, (ii) receive past event indicators, and (iii) analyze timing and sequencing of the current event indicators and past event indicators to determine a likelihood of fault in the turbine engine.

2. The system of claim 1 wherein the discrete event system model further generates new event indicators in response to the timing and sequencing of the current event indicators and past event indicators, and wherein the new event indicators are fed back for use as the past event indicators in a next analysis cycle.

3. The system of claim 1 wherein the discrete event system model comprises a Petri net, and wherein the event indictors comprise markings.

4. The system of claim 3 wherein the Petri net includes a plurality of place nodes and transitions, wherein the Petri net updates tokens at the plurality of place nodes in response to the event indicators.

5. The system of claim 1 wherein the discrete event system model is adapted to analyze timing and sequencing of the event indicators to determine a likelihood of fault in the turbine engine by:
   determining if the engine speed event indicator is followed by the engine temperature event indicator within a first specified time period; and
   determining if the start time event indicator is within a second specified time period of the engine temperature event indicator.

6. The system of claim 1 wherein the sensor data comprises indications of an event in a component in the turbine engine.

7. A method of detecting faults in a turbine engine, the method comprising the steps of:
   a) receiving sensor data from the turbine engine, wherein the sensor data comprises engine speed at peak exhaust gas temperature, exhaust gas temperature at peak exhaust gas temperature, and time to engine start;
   b) analyzing the sensor data to determine if specified events have occurred by comparing the engine speed at peak exhaust gas temperature to a first value to determine engine speed deviation from the first value, comparing the exhaust gas temperature at peak exhaust gas temperature to a second value to determine engine temperature deviation from the second value, and comparing the time to engine start to a third value to determine engine start time deviation from the third value;

c) generating current event indicators responsive to the occurrence of the specified events by generating an engine speed event indicator responsive to the engine speed deviation exceeding a first threshold, generating an engine temperature event indicator responsive to the engine temperature deviation exceeding a second threshold, and generating a start time event indicator responsive to the engine start time deviation exceeding a third threshold;

d) receiving past event indicators from a previous analysis cycle of the turbine engine; and e) analyzing timing and sequencing of the current event indicators and past event indicators to determine a likelihood of fault in the turbine engine.

8. The method of claim 7 further comprising the step of generating new event indicators in response to the timing and sequencing of the current event indicators and past event indicators, and wherein the new event indicators are used as the past event indicators in a next analysis cycle.

9. The method of claim 7 wherein the step of analyzing timing and sequencing of the current event indicators and past event indicators to determine a likelihood of fault in the turbine engine comprises analyzing using a Petri net.

10. The method of claim 9 wherein the Petri net includes a plurality of place nodes and transitions, wherein the Petri net updates tokens at the plurality of place nodes in response to the event indicators.

11. The method of claim 7 wherein the step of analyzing timing and sequencing of the current event indicators and past event indicators to determine a likelihood of fault in the turbine engine comprises:
determining if the engine speed event indicator is followed by the engine temperature event indicator within a first specified time period; and
determining if the start time event indicator is within a second specified time period of the engine temperature event indicator.

12. A program product comprising:

a) a fault detection program for detecting fault in a turbine engine, the program including:
an event determination program module, the event determination program module adapted to:
(i) receive sensor data from the turbine engine, wherein the sensor data comprises engine speed at peak exhaust gas temperature, exhaust gas temperature at peak exhaust gas temperature, and time to engine start;

(ii) analyze the sensor data to determine if specified events have occurred by comparing the engine speed at peak exhaust gas temperature to a first value to determine engine speed deviation from the first value, comparing the exhaust gas temperature at peak exhaust gas temperature to a second value to determine engine temperature deviation from the second value, and comparing the time to engine start to a third value to determine engine start time deviation from the third value; and (iii) generate current event indicators responsive to the occurrence of the specified events by generating an engine speed event indicator responsive to the engine speed deviation exceeding a first threshold, generating an engine temperature event indicator responsive to the engine temperature deviation exceeding a second threshold, and generating a start time event indicator responsive to the engine start time deviation exceeding a third threshold; and a discrete event system model program module, the discrete event system model program module adapted to (i) receive the current event indicators, (ii) receive past event indicators, and (iii) analyze timing and sequencing of the current event indicators and past event indicators to determine a likelihood of fault in the turbine engine; and b) computer-readable signal bearing media bearing said program.

13. The program product of claim 12 wherein the discrete event system model further generates new event indicators in response to the timing and sequencing of the current event indicators and past event indicators, and wherein the new event indicators are fed back for use as the past event indicators in a next analysis cycle.

14. The program product of claim 12 wherein the discrete event system model comprises a Petri net, and wherein the event indictors comprise markings.

15. The program product of claim 14 wherein the Petri net includes a plurality of place nodes and transitions, wherein the Petri net updates tokens at the plurality of place nodes in response to the event indicators.

* * * * *